United States Patent [19]

Ueda et al.

[11] Patent Number: 4,940,319

[45] Date of Patent: Jul. 10, 1990

[54] X-RAY MIRROR APPARATUS AND METHOD OF MANUFACTURING THE SAME

[75] Inventors: Katsunobu Ueda; Mitsuo Sumiya; Michio Baba, all of Yokohama, Japan

[73] Assignee: Kabushiki Kaisha Toshiba, Kawasaki, Japan

[21] Appl. No.: 342,793

[22] Filed: Apr. 25, 1989

[30] Foreign Application Priority Data

Apr. 28, 1988 [JP] Japan ................................ 63-104096

[51] Int. Cl.[5] ................................................ G02B 5/08

[52] U.S. Cl. .................................... 350/613; 350/618; 350/619; 350/1.1

[58] Field of Search ............... 350/600, 601, 612, 613, 350/618, 629, 320, 1.1, 619; 250/484.1

[56] References Cited

U.S. PATENT DOCUMENTS 4,063,088 12/1977 Dailey .
4,415,810 11/1983 Brown, Sr. ........................ 250/484.1
4,742,225 5/1988 Chan ............................ 250/327.2 D

FOREIGN PATENT DOCUMENTS 63-123000 5/1988 Japan .

OTHER PUBLICATIONS

Optical Engineering, vol. 25, No. 8, Aug. 1986, pp. 970–978, Society of Photo-Optical Instrumentation Engineers, Bellingham, Washington, U.S.; R. B. Hoover et al., "Spectral Slicing X-Ray Telescope".

*Primary Examiner*—Bruce Y. Arnold
*Assistant Examiner*—Jay Ryan
*Attorney, Agent, or Firm*—Oblon, Spivak, McClelland, Maier & Neustadt

[57] ABSTRACT

An X-ray mirror apparatus includes a substantially cylindrical mirror body and a pair of light shielding members provided at both open ends of the mirror body. The inner surface of the mirror body constitutes a reflecting mirror surface having a surface of revolution. Each light shielding member has a light shielding plate arranged at the opened end of the mirror body to block it, and an annular slit allowing passage of X-rays entering onto and reflected on the reflecting mirror surface. A cylindrical fitting member is fixed to the light shielding plate to be coaxial with the slit. The fitting member is fitted on the opened end portion of the mirror body, thereby positioning the light shielding member so that the slit is located coaxial with the axis of the reflecting mirror surface.

12 Claims, 4 Drawing Sheets

X-RAY MIRROR APPARATUS AND METHOD OF MANUFACTURING THE SAME

BACKGROUND OF THE INVENTION

1. Field of the Invention

The present invention relates to an X-ray mirror apparatus for use, for example, in an X-ray microscope and a method of manufacturing the same.

2. Description of the Related Art

An X-ray has a shorter wavelength than that of visible light and a greater transmission power than an electron beam. Since the X-ray has an absorption wavelength band inherent to each element, it is possible to identify a specified element through the utilization of the aforementioned nature of the X-ray as well as a fluorescent X-ray. For this reason, the X-ray provides an important means capable of obtaining atomic level information relating to an object.

In the X-ray wavelength region, however, the refractive index of an object is very approximate to unity. It has, therefore, been difficult to manufacture lenses and mirrors for X-rays, which have the same functions as that of a refractive lens and a direct incident type reflecting mirror used in the visible region.

A recently developing X-ray microscope uses an X-ray mirror utilizing such a nature that when an X-ray is incident at a very great angle on a reflection surface, that is, when it is incident at a grazing angle thereon, a total reflection occurs. Known as an X-ray mirror is a mirror having a Wolter-type reflecting surface. This mirror has a substantially cylindrical configuration, and its inner surface constitutes a reflection surface of a hyperboloid of revolution and a reflection surface of an ellipsoid of revolution in a continuous relation. These reflection surfaces has a common focal point F1. With a focal point F2 as an object point the mirror reflects an X-ray, which passes through the object point, on the aforementioned two reflection surfaces, forming an image on a focal point F3. In this way, the deformation of an image on the object point away from the optical axis is reduced by using two reflection surfaces.

In the case of applying the X-ray mirror having the aforementioned configuration to a X-ray microscope, light shielding plates are disposed one at each open end of the X-ray mirror so that an X-ray which is reflected on the two reflecting surfaces may be imaged on a detector on the focal point F3. The light shielding plates are adapted to shield that X-rays of an X-ray beam emerging from the object point which are directed toward the detector without being incident on the reflection surfaces. The X-rays enter into the mirror through an annular split defined between the peripheral edge of one of the light shielding plates and one open end edge of the mirror and leave the mirror through an annular slit defined between the peripheral edge of the other light shielding plate and the other open end edge of the mirror. It is necessary that these slits be coaxially located with the center axis of the X-ray mirror with an accuracy of several μm to several 10 μm.

In a conventional X-ray microscope having the X-ray mirror, the two light shielding plates are coupled by a plurality of wires or rods to the mirror so as to be located coaxial therewith. In this structure, however, a part of the slit is shielded by the wires or rods, thus causing a fall in the light collection efficiency of the X-ray beam. Furthermore, due to a fall in the light collection efficiency, a blurred image and a scattering of an X-ray may occur. The scattering of an X-ray induces ghosts. It has also been very difficult, in view of the X-ray not being visible light, to accurately align the light shielding plate with the X-ray mirror and it has also been cumbersome to perform the alignment.

SUMMARY OF THE INVENTION

The present invention is contrived in consideration of the above circumstances and its object is to provide an X-ray mirror apparatus capable of readily and exactly aligning a light shielding plate with an X-ray mirror and a method for manufacturing the same.

According to the present invention, there is provided an X-ray mirror apparatus comprising a substantially cylindrical mirror body having opened ends and an inner surface which provides a reflecting mirror surface having a surface of revolution; and light shielding means provided on at least one open end of the mirror body, for allowing only passage of that X-rays entering onto the reflecting mirror surface and that X-rays reflected on the reflecting mirror surface, said light shielding means including a light shielding plate arranged at said one open end to block it, a substantially annular slit through which the X-rays can be passed, and a fitting member fitted over said one end of the mirror body so as to mount the light shielding plate on the mirror body in a manner to have the slit located coaxial with an axis of the reflecting mirror surface.

According to the apparatus thus manufactured, the light shielding means has a mating section fitted over the end portion of the mirror body whereby the slit is positioned coaxial with the reflecting mirror surface. It is thus possible to readily and positively align the slit with the reflecting mirror surface.

According to a manufacturing method of the present invention, the light shielding plate having a slit is manufactured by forming a light shielding film not allowing passage of X-rays, by a physical vapor deposition on a light transmission film which allows passage of the X-rays.

According to another method of the present invention, the light shielding plate having a slit is manufactured by forming the slit, by a photoetching method on a disc which does not allow passage of X-rays.

DETAILED DESCRIPTION OF THE PREFERRED EMBODIMENTS

Embodiments of the present invention will be explained in detail with reference to the accompanying drawings.

Figure 1:
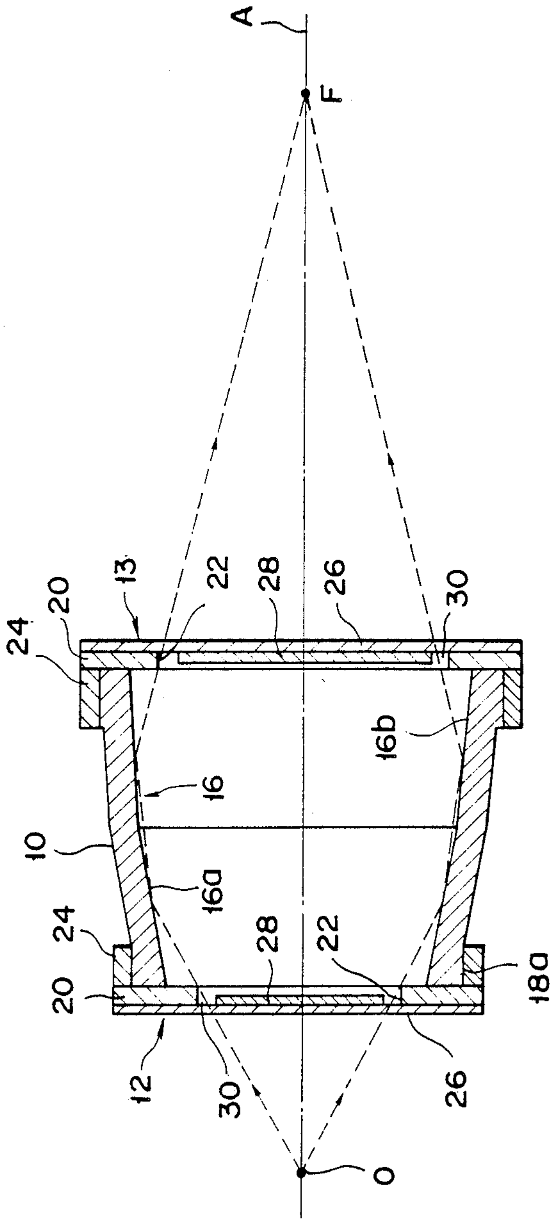
FIG. 1 is a longitudinal sectional view showing an X-ray mirror apparatus according to a first embodiment of the present invention.
Figure 2:
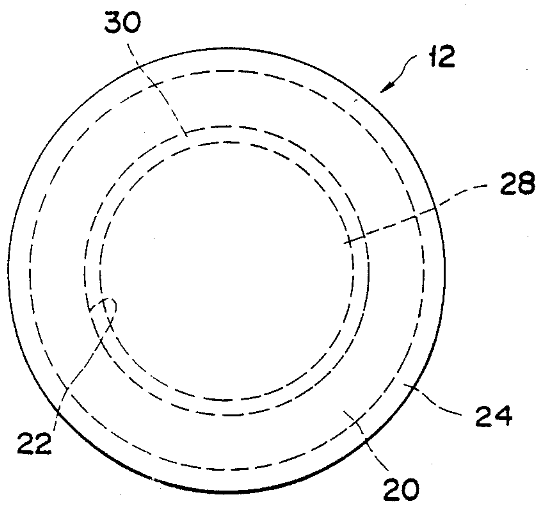
FIG. 2 is a front view showing a light shielding member of the X-ray mirror apparatus of FIG. 1.

FIGS. 1 and 2 show an X-ray mirror apparatus according to a first embodiment of the present invention.

The apparatus comprises a substantially cylindrical mirror body 10 opened at both ends and a pair of light shielding members 12 and 13 provided at both ends of the mirror body.

The mirror body 10 is made of, for example, copper or nickel, and a gold film is coated on the inner surface thereof. The inner surface of the mirror body 10 constitutes a tandem type reflecting mirror surface 16. Specifically, in the inner wall surface of the mirror body 10, a first reflecting mirror surface 16*a* forming a hyperboloid of revolution is provided at one end portion of the mirror body 10 and a second reflecting mirror surface 16*b* forming an ellipsoid of revolution is provided at the other end portion of the mirror body. The first and second reflecting mirror surfaces 16*a* and 16*b* are coaxially formed in a continuous relation. The outer circumferential surfaces of both end portions of the mirror body 10 are formed to be coaxial with the mirror surfaces 16*a* and 16B, and constitute first and second engage sections 18*a* and 18*b*, respectively.

The light shielding member 12 has a ring-like disc 20 formed of a 2 mm-thick copper plate and having a circular inner opening, and a cylindrical fitting member 24 fixed to one surface of the disc 20 in a relation coaxial with the inner opening 22. The inner diameter of the fitting member 24 is substantially equal to the outer diameter of the engage section 18*a*. A light transmitting film 26 is fixed to the other surface of the disc 20 and closes the inner opening 22. The film 26 about 2 μm thick is formed of a material, such as polyethylene, beryllium and lithium. A circular light shielding film 28 is formed, by means of, for example, a vapor deposition method or sputtering method, on that surface of the film 26 which contacts with the disc 20. The light shielding film 28 about 5 μm thick is formed of a material, such as gold or platinum. The film 28 is formed coaxial with the inner opening 22 and has a smaller diameter than that of the inner opening 22. Thus, an annular slit 30 is defined between the edge of the inner opening 22 and the outer circumferential edge of the light shielding film.

The light shielding member 12 thus formed is fixed to one end of the mirror body by fitting the fitting member 24 over the engage section 18*a* of the mirror body 10. As set forth above, the engage section 18*a* is formed coaxial with the reflecting mirror surface 16 and the fitting section 24 of the light shielding member 12 is located coaxial with the inner opening 22. Accordingly, with the light shielding member 12 mounted on the mirror body 10, the slit 30 is located exactly coaxial with the reflecting mirror surface 16. An X-ray transmission ratio between the light shielding film 28 and the light transmission film 26 is 1 : 1000.

The other light shielding member 13 is similarly constructed as the light shielding member 12. In this case, the same reference numerals are employed to designate parts or elements corresponding to those shown in the light shielding member 12 and further explanation is, therefore, omitted. In this connection, it is to be noted that the diameter of each component part of the light shielding member 13 is set greater than that of the light shielding member 12 so as to conform to the reflecting mirror surface 16*b*. The light shielding member 13 is fixed to the other end of the mirror body 10 by fitting the fitting member 24 over the engage section 18*b* of the mirror body 10. While the light shielding member 13 is fitted over the mirror body 10, a slit 30 of the member 13 is exactly located coaxial with the reflecting mirror surface 16.

According to the X-ray mirror apparatus having the above construction, as is shown in FIG. 1, most of X-rays of an X-ray beam passing through an object point 0 situated on a center axis A of the reflecting mirror surface 16 of the mirror body 10 are shielded by the light shielding film 28 of the light shielding member 12. Only some X-rays enter into the mirror body 10 through the light transmission film 26 and slit 30. The slit 30, in particular, is so located and dimensioned as to allow only passage of those X-rays of an X-ray beam which will incident on the first reflecting mirror surface 16*a* of the mirror body 10.

The X-rays, which are incident on the reflecting mirror surface 16*a*, are reflected there and incident on the second reflecting mirror surface 16*b*. After being reflected on the reflection mirror surface 16*b*, the X-rays are directed toward the light shielding member 13. The slit 30 of the light shielding member 13 is so formed as to be located on an optical path of those X-rays which are reflected on the reflecting mirror surface 16*b*. Thus, the X-rays, after passing through the slit 30 and light transmitting film 26, are imaged on a focal point F on the center axis 0 of the reflecting mirror surface 16.

According to the X-ray mirror apparatus thus constructed, the respective light shielding member has the fitting member 24 and is mounted on the mirror body 10 by fitting the fitting member over the engage section of the mirror body 10. Since the fitting member 24 is located coaxial with the slit 30, the slit can be readily brought into exact alignment with the center axis of the reflecting mirror surface 16 of the mirror body 10 by simply fitting the fitting member 24 over the corresponding engage section of the mirror body. Thus, any cumbersome alignment control which may otherwise been required in the conventional apparatus is unnecessary, so that an apparatus of high accuracy can be effectively manufactured.

Since the slit 30 of the light shielding member is defined by the inner peripheral edge of the disc 20 and outer peripheral edge of the light shielding film 28, any wires or rods, which are employed in the conventional apparatus, are not located in the slit 30. It is thus possible to prevent a decline in the X-ray collection efficiency as well as the scattering of an X-ray. As a result, it is possible to obtain a well-defined X-ray image.

A fuller explanation will be given below of a method of manufacturing the X-ray mirror apparatus and, in particular, a method of manufacturing the light shielding member.

In the manufacture of the light shielding member, first the fitting member 24 is jointed by means of, for example, brazing to the outer peripheral portion of the disc 20 to be coaxial therewith. Then, on the circular light transmitting film 26 which has the same diameter as that of the disc 20, a circular light shielding film 28 about 5 μm is formed by a physical vapor deposition, such as a vapor deposition method and sputtering method, such that it is coaxial with the light transmitting film. The light transmitting film 26 which the light shielding film 28 is bonded by, for example, a rapid-bonding adhesive to the surface of the disc 20 opposite to that surface on which the fitting member 24 is provided, and is located concentric with the disc 20.

The light shielding member thus manufactured is fixed to the mirror body 10 by fitting the fitting member 24 to the engage section of the mirror body. Upon fitting the light shielding member on the mirror body, the slit of the light shielding member is automatically aligned with the center axis of the reflecting mirror surface 16 of the mirror body.

Figure 4:
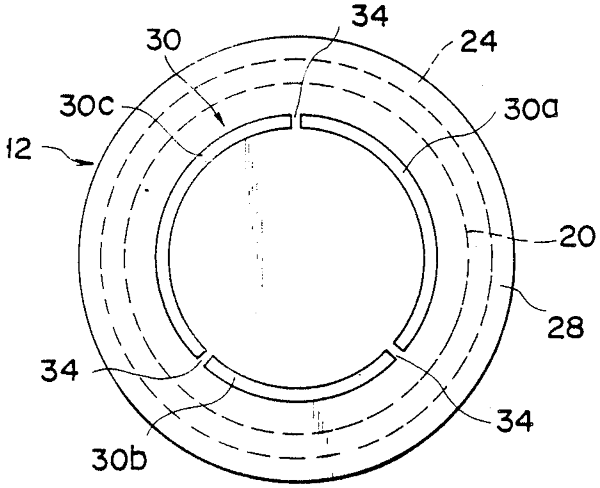
FIG. 4 is a front view showing a light shielding member of the X-ray mirror apparatus of FIG. 3.
Figure 3:
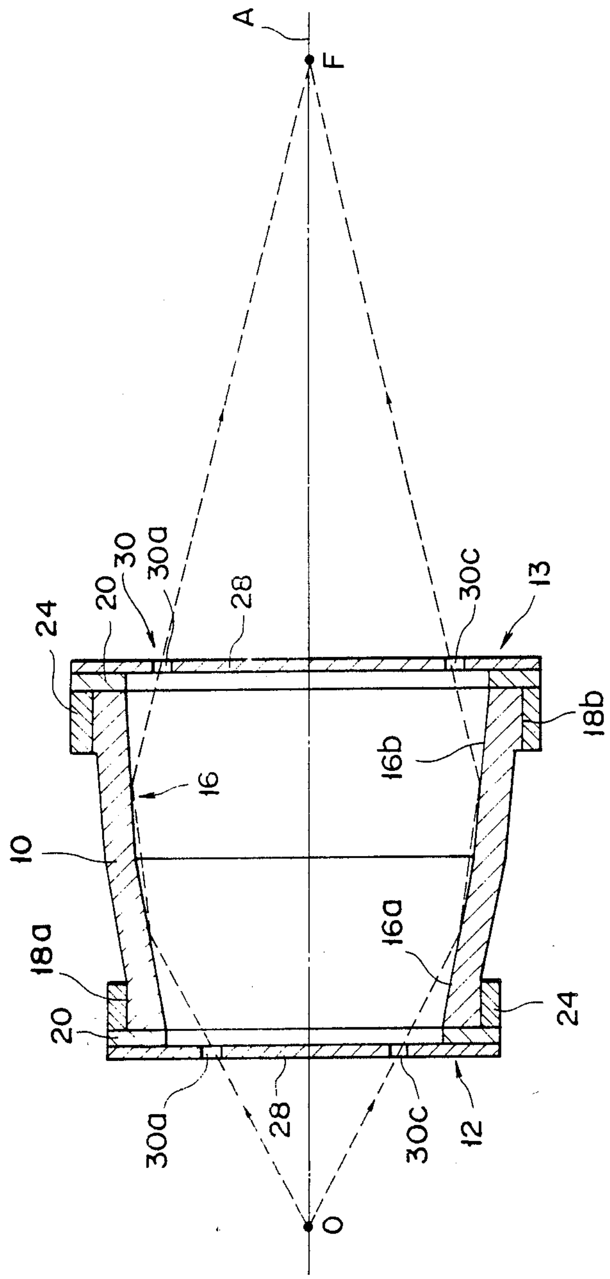
FIG. 3 is a longitudinal sectional view showing an X-ray mirror apparatus according to a second embodiment of the present invention.

In the aforementioned embodiment, the slit 30 of the respective light shielding member is defined by the disc 20 fixed to the light transmitting film 26 and the light shielding film 28. However, the light shielding member may be constructed as is shown in FIGS. 3 and 4 (second embodiment).

According to the second embodiment, a light shielding member 12 has a circular light shielding film 28 about 40 μm thick formed of copper and having a slit 30. The slit 30 includes three arcuate segments 30*a*, 30*b* and 30*c*. These segments extend along a circle which is concentric with that of the light shielding film 28. A gold thin film is coated on each surface of the light shielding film 28 to improve corrosion resistance thereof. That portion of the light shielding film 28 which is located at a boundary between the two adjacent segments constitutes a bridge 34 about 0.2 mm thick. A section of the light shielding film 28 located inside the segments 30*a* to 30*c* is coupled by the bridges 34 to a section of the light shielding film 28 located outside the segments.

An annular disc 20 is fixed to the outer marginal portion of one surface of the light shielding film 28. A cylindrical fitting member 24 is fixed to the disc 20 to be coaxial with the light shielding film 28, that is, coaxial with the segments 30*a* to 30*c*.

The light shielding member 12 thus constructed is fixed to a mirror body 10 by fitting the fitting member 24 over an engage section 18*a* of the mirror body. Thus, with the light shielding member 12 attached to the mirror body 10, the segments 30*a* to 30*c* of slit 30 are positioned coaxial with the reflecting mirror surface 16.

A light shielding member 13 is also constructed in the same fashion as the light shielding member 12. In this case, identical reference numerals are employed to designate parts and elements corresponding to those shown in the light shielding member 12 and further explanation is, therefore, omitted.

According to the X-ray mirror apparatus of the second embodiment, the respective light shielding member has the fitting member 24 coaxial with the slit 30 and is mounted on the mirror body 10 by fitting the fitting member over the mirror body. For this reason, the slit 30 can be readily and accurately aligned with the reflecting mirror surface 16 of the mirror body 10.

Furthermore, unlike the first embodiment, the slit is not covered by any light transmitting film. Thus, some X-rays entering into the mirror body 10 or leaving it through the segments 30*a* to 30*c* of the slit 30 are not absorbed by that light transmitting film. Furthermore, since the width of the bridges 34 of the respective light shielding member is very small, that is, as small as about 0.1 mm, an amount of X-rays passing through the slit 30 is not lost by the bridges 34. According to the second embodiment, a fall in resolution of the X-ray image does not occur, positively ensuring a well-defined image.

The respective light shielding member of the second embodiment is manufactured in the following way.

First, on the light shielding film 38 is formed a photoresist having a pattern with through holes for forming segments 30*a* to 30*c*. Then, segments 30*a* to 30*c* are formed in the light shielding film 28 by a method, such as a chemical etching, dry etching, reactive ion etching or sputter-etching, followed by the removal of the remaining photoresist. By so doing, the light shielding film 28 is completed. Then, a disc 20 is bonded to the outer marginal portion of the surface of the light shielding film 28, and a fitting member 24 formed of copper is jointed by, for example, a brazing to the disc in a relation coaxial with the segments 30*a* to 30*c*.

The light shielding member, after being the formed, is fitted over the mirror body 10. Since, in this case, the segments 30*a* to 30*c* are formed by a photoetching method and the light shielding film 28 is mounted on the mirror body 10 by using the fitting member 24, the segments 30*a* to 30*c* can be positioned coaxial with the center axis of the reflection mirror surface 16 with accuracy of a few μm to a few tens of μm.

Since the light shielding member can be readily and accurately aligned with the mirror body, it is possible to highly improve the manufacturing efficiency of the X-ray mirror apparatus.

Figure 5:
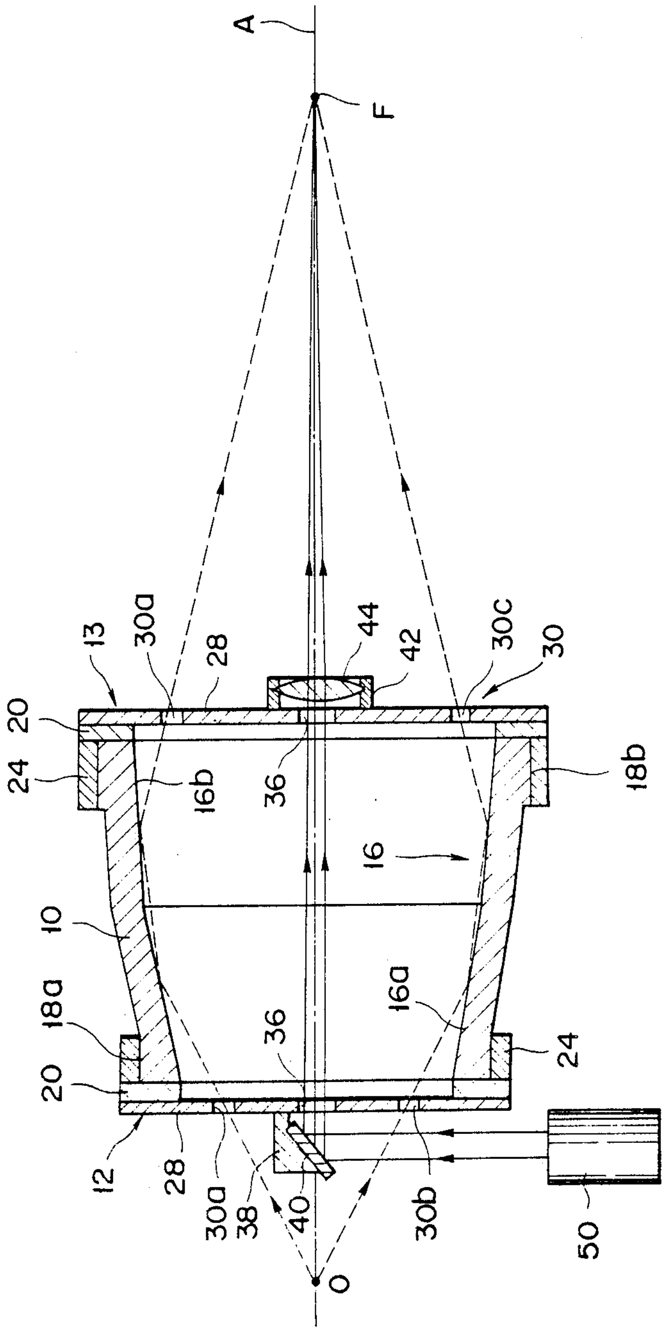
FIG. 5 is a longitudinal sectional view showing an X-ray mirror apparatus according to a third embodiment of the present invention.

FIG. 5 shows an X-ray mirror apparatus according to a third embodiment of the present invention.

In this case, identical reference numerals are employed to designate parts or elements corresponding to those shown in the second embodiment. Further explanation is, therefore, omitted.

A through-hole 36 is formed in a light shielding film 28 of light shielding members 12 and 13 to be coaxial with a center axis A of a reflecting mirror surface 16 of a mirror body 10. A plane mirror 40 is mounted by a support member 38 on the outer surface of the light shielding film 28 of the light shielding member 12 such that it is located opposite to the through hole 36. A lens 44 is mounted by a support member 42 on the outer surface of the light shielding film 28 of the light shielding member 13 so that an optical axis A of the lens 44 is aligned with the center axis of through hole 36. A support member 42 is movably mounted relative to the light shielding film 28 so that the lens 44 may be position-controlled relative to the center axis A. The apparatus includes a laser oscillator 50 which is arranged outside the mirror body 10 and opposite to the plane mirror 40.

According to the X-ray mirror apparatus thus constructed, a visible laser beam 52 emitted from the laser oscillator 50 is reflected by the mirror 40 and enters into the mirror body 10 past the through hole 36. The laser beam is derived out of the mirror body 10 past the through-hole 36 of the light shielding member 13 and focused on a focal point F of the reflecting mirror surface 16 by the lens 44.

According to the apparatus as set forth above, it is possible for the user to visually observe the X-ray focal point F of the reflecting mirror surface 16 with the use of the laser beam. It is thus possible to readily perform various kinds of control operations on the X-ray mirror apparatus, such as to have the X-ray focal point F of the reflecting mirror surface 16 of the X-ray mirror body 10 directed at a desired position.

The present invention is not limited to the above embodiments, and various changes and modifications may be made within the spirit and scope of the present invention. For example, in the aforementioned embodiments, if the light shielding member is provided on at least one end of the mirror body 10, the same advantages as in the aforementioned embodiments can be obtained. The X-ray mirror apparatus of the present invention can be applied to an X-ray telescope, a stepper for a semiconductor exposure system, and the like without being restricted to an X-ray microscope.

What is claimed is:

1. An X-ray mirror apparatus comprising:

a substantially cylindrical mirror body having opened ends and an inner surface which forms a reflecting mirror surface having a surface of revolution; and light shielding means provided on at least one open end of the mirror body, for allowing only the passage of X-rays entering onto the reflecting mirror surface and X-rays reflected on the reflecting mirror surface, said one open end portion of the mirror body having an outer circumferential surface which is coaxial with the reflecting mirror surface and forms an engage section, said light shielding means including a light shielding plate provided on said one open end to block the one open end, a substantially annular slit allowing passage of the X-rays, and fitting means for positioning the light shielding plate with respect to the mirror body so that the slit is located coaxial with an axis of the reflecting mirror surface, said fitting means having a cylindrical fitting member which is coaxial with the slit and fitted over the engage section.

2. An apparatus according to claim 1, wherein said slit has a plurality of arcuate segments formed in the light shielding plate, and said arcuate segments are formed along a circle which is concentric with the axis of the reflecting mirror surface.

3. An apparatus according to claim 2, wherein said fitting means has a cylindrical fitting member fixed to the light shielding plate to be coaxial with the slit.

4. An apparatus according to claim 1, wherein said reflecting mirror surface has an X-ray focal spot located outside the mirror body and on the axis of the reflecting mirror surface, and which further comprises:

means for visually observing the X-ray focal spot, said observing means including a through hole formed in the light shielding plate to be coaxial with the reflection mirror surface, light emitting means provided outside the mirror body, for emitting visible light, and an optical system for directing the visible light emitted from the light emitting means toward the X-ray focal spot through the through hole and the interior of the mirror body and imaging the visible light on the X-ray focal spot.

5. An apparatus according to claim 1, wherein said reflecting mirror surface has a first reflecting mirror surface located on one end portion of the mirror body and a second reflecting mirror surface located on the other end portion of the mirror body in a continuous relation to the first reflecting mirror surface.

6. An X-ray mirror apparatus comprising:

a substantially cylindrical mirror body having opened ends and an inner surface which forms a reflecting mirror surface haven a surface of revolution; and light shielding means provided on at least one open end of the mirror body, for allowing only the passage of X-rays entering onto the reflecting mirror surface and X-rays reflected on the reflecting mirror surface, said light shielding means including:

an X-ray transmitting film provided to block said one open end of the mirror body, a light shielding plate having a first light shielding section of a circular configuration fixed on one surface of the X-ray transmitting film to be coaxial with an axis of the reflecting mirror surface, and a second light shielding section of an annular configuration fixed on the one surface of the X-ray transmitting film to be coaxial with the first light shielding section and located outside the first light shielding section with an annular space therebetween, a substantially annular slit defined by the annular space and allowing the passage of X-rays, and fitting means fitted to said one end of the mirror body, for positioning the light shielding plate with respect to the mirror body so that the slit is located coaxial with an axis of the reflecting mirror surface.

7. An apparatus according to claim 12, wherein said one open end portion of the mirror body has an outer circumferential surface which is coaxial with the reflecting mirror surface and forms an engage section, and said fitting means has a cylindrical fitting member which is coaxial with the slit and fitted over the engage section.

8. An apparatus according to claim 6, wherein said fitting means has a cylindrical fitting member fixed to the second light shielding section to be coaxial with the slit.

9. An X-ray mirror apparatus comprising:

a substantially cylindrical mirror body having opened ends and an inner surface which forms a reflecting mirror surface having a surface of revolution, said reflecting mirror surface having an X-ray focal spot located outside the mirror body and on an axis of the reflecting mirror surface;

light shielding means provided on at least one open end of the mirror body, for allowing only the passage of X-rays entering onto the reflecting mirror surface and X-rays reflected on the reflecting mirror surface, said light shielding means including a light shielding plate provided to block said one open end, a substantially annular slit allowing passage of the X-rays, and fitting means fitted to said one end of the mirror body, for positioning the light shielding plate with respect to the mirror body so that the slit is located coaxial with the axis of the reflecting mirror surface; and means for visually observing the X-ray focal spot, said observing means including a through hole formed in the light shielding plate to be coaxial with the reflection mirror surface, light emitting means provided outside the mirror body, for emitting visible light, and an optical system for directing the visible light emitted from the light emitting means toward the X-ray focal spot through the through hole and the interior of the mirror body and imaging the visible light on the X-ray focal spot.

10. An apparatus according to claim 9, wherein said light shielding means includes an X-ray transmitting film provided to block said one open end of the mirror body, said light shielding plate has a first light shielding section of a circular configuration fixed on one surface of the X-ray transmitting film to be coaxial with an axis of the reflecting mirror surface, and a second light shielding section of an annular configuration fixed on the one surface of the X-ray transmitting film to be coaxial with the first light shielding section and located outside the first light shielding section with an annular space therebetween, and said slit is defined by the annular space.

11. A method of manufacturing a light shielding member which is provided on an open end of a substantially cylindrical X-ray mirror having an inner surface defining a reflecting mirror surface having a surface of revolution and which allows only passage of X-rays entering onto the reflecting mirror surface and X-rays reflected on the reflecting mirror surface, the method comprising the steps of:

forming a first circular light shielding section shielding X-rays, by a physical vapor deposition, on an X-ray transmitting film which has a size enough great to block said one open end of the X-ray mirror;

fixing a second annular light shielding section shielding X-rays on the X-ray transmission film such that it is located coaxial with the first light shielding section and outside the first light shielding section with an annular space therebetween, thereby defining an annular split, which allows passage of X-rays, between the first and second light shielding sections; and fixing a cylindrical fitting member, which is capable of fitting over said one end portion of the X-ray mirror, on the second light shielding section in a relation coaxial with the annular slit.

12. A method of manufacturing a light shielding member which is provided on an open end of a substantially cylindrical X-ray mirror having an inner surface defining a reflecting mirror surface having a surface of revolution and which allows only passage of X-rays entering onto the reflecting mirror surface and X-rays reflected on the reflecting mirror surface, the method comprising the steps of:

forming an X-ray penetrable slit of a substantially annular configuration, by a photoetching, in a light shielding plate which has a size enough great to block said one open end of the X-ray mirror and which prevents passage of X-rays; and fixing a cylindrical fitting member, which is capable of fitting over said one open end portion of the X-ray mirror, on the light shielding plate on the outer side of the slit to be coaxial therewith.

* * * * *